UNITED STATES PATENT OFFICE.

WINFIELD S. POTTER, OF NEW YORK, N. Y., ASSIGNOR TO ALLOY STEEL FORGING COMPANY, OF WILMINGTON, DELAWARE, A CORPORATION OF DELAWARE.

METHOD OF MACHINING MANGANESE STEEL.

1,018,001.  Specification of Letters Patent.  Patented Feb. 20, 1912.

No Drawing.  Application filed December 29, 1911. Serial No. 668,455.

*To all whom it may concern:*

Be it known that I, WINFIELD S. POTTER, a citizen of the United States, and a resident of New York, borough of Manhattan, in the county of New York and State of New York, have made and invented certain new and useful Improvements in Methods of Machining Manganese Steel, of which the following is a specification.

My invention relates to methods of machining to finished form and dimensions such cast or wrought shapes of steels containing high percentages of carbon and manganese as are non-machineable in the cold state, and has particularly for its object the production of finished manganese steel shapes in a tough and strong condition suitable for service, and with accurate machined surfaces as may be required.

I have found that whereas austenitic manganese steel at ordinary temperatures cannot be machined by means of high speed steel cutting tools, the cutting edges of tools formed of high speed steel are sufficiently strong to effect such machining at temperatures at the surface of intended cleavage in the manganese steel above 300° C. or thereabout. As high speed steel of good quality, after being suitably hardened does not lose its strength or hardness until reheated to a temperature of about 600° to 650° C., the machining of the manganese steel may not only be done at temperatures approximating 300° C. but at any higher temperature providing that the cutting edge of the high speed steel tool is not, during the operation, heated to above its softening or annealing temperature of 600° to 650° C. In some cases the manganese steel may have a considerably higher temperature while being machined than the softening temperature of the high speed steel, and notably so when the cutting is done by a number of rapidly moving cutting edges as is the case of a rapidly turning milling cutter or burring wheel, or when, as in the case of a punch, the machining is accomplished rapidly and when the machining tool remains in contact with the work for a time so short that the tool steel does not acquire the temperature of the machined piece.

The practice of my invention depends in some cases on the further discovery that when heat treated and toughened manganese steel is reheated for any desired time to temperatures not above the critical point lying approximately at 420° C.; or to a somewhat higher temperature as, for example, to 550° C. for a short time; the tough properties of the metal in the cold state due to the uniform distribution in the metal of such of its constituents as the carbids of iron and of manganese are not lost by such reheating.

Furthermore, I have found that whereas manganese steel in a heated condition, that is, while having temperatures above 300° C. may be cut or machined with tools of high speed steel, providing that the metal has been previously heat-treated and brought into a homogeneous condition, the metal if not previously heat-treated, that is so heated that the carbids of the metal have entered into solid solution in the grains or crystals of the steel, cannot be machined without damage to the edges of high speed steel tools.

Accordingly, my invention comprises methods of machining previously heat-treated manganese steel at temperatures above 300° C., and of restoring thereafter the uniform and tough condition of the metal which has been lost by long heating of the metal at temperatures above 420° C. by suitably reheating and quenching the metal; and methods of machining such steel at temperatures substantially between 300 and 420° C., by means of tools of high speed steel.

In the practice of my invention, a cast or wrought blank, such as a blank shape for conversion into a cut gear, if not already heat-treated is first brought to a temperature of about 1000° C. and held at an equalized temperature, preferably within a range between about 975 and 1025° C. until its carbids are in solution, and until the metal is so uniformly re-crystallized that thereafter its texture will be adapted to the subsequent cutting or machining. The blank may now be subjected to a rough and rapid preliminary cutting to approximate the intended finished shape; or, may be rapidly cooled to below 420° C. and afterward heated to temperatures ranging from 300° C. to 1075° C., and preferably to temperatures between 300° C. and about 1000° C. depending on the depth of the required cut and the time which the cutting edge of the tool is to remain in contact with the machined metal, and machined at that temperature. The rough cut and partially machined shape is now heat-treated by holding it for a short time at about 1000° C. and then rapidly cooling it as by water quenching, to below 420° C. throughout the section of the shape. When further and more accurate cutting is required the heat-treated shape is next so heated that in the final accurate machining the cutting edge of the machining tool of high speed steel will traverse the surface of cleavage while the manganese steel at this surface has a temperature between 300° C. and 420° C. To this end the shape to be machined may be heated at its surface in such manner that at the moment of cutting at any point the surface of cleavage will have the desired machining temperature, that is, within a range between 300 and 420° C.; or the mass may be heated throughout to any temperature between 300 and 420° C. and then so quickly machined that the surface of cleavage will still have the temperature within the range above specified. The finished shape is now evenly cooled to atmospheric temperature to avoid distortion after the machining.

Having thus described and explained the process wherein my invention consists and having announced the discoveries whereupon it depends, I claim and desire to secure by Letters Patent:—

1. The method of machining blanks of manganese steel previously heat-treated to secure uniformity and homogeneousness of structure which comprises heating the blank to a temperature between 300° C. and 1075° C.; machining it while in such heated condition; and finally imparting qualities of toughness to the blank by water quenching, substantially as described.

2. In the machining of blanks of manganese steel previously heat-treated to secure uniformity and homogeneousness of structure and then so rapidly cooled as to render the uniform state permanent, the method which comprises heating the blank to a temperature between 300° C. and 420° C.; and machining the blank while in such heated condition, substantially as described.

3. In the machining of blanks of manganese steel previously heat-treated to secure uniformity and homogeneousness of structure the method which comprises heating the blank to a temperature between 300° C. and 420° C.; and machining the blank while in such heated condition, substantially as described.

4. In the machining of blanks of manganese steel previously heat-treated to secure uniformity and homogeneousness of structure the method which comprises machining the blank at a temperature between 420° C. and 1075° C.; heating the blank to a temperature of approximately 1000° C.; and water quenching the machined blank, substantially as described.

Signed at New York borough of Manhattan in the county of New York and State of New York this 27th day of December A. D. 1911.

WINFIELD S. POTTER.

Witnesses:
R. N. FLINT,
H. M. WHITE.